May 5, 1931. L. HAZY 1,804,099
KITCHEN UTENSIL
Filed March 1, 1929
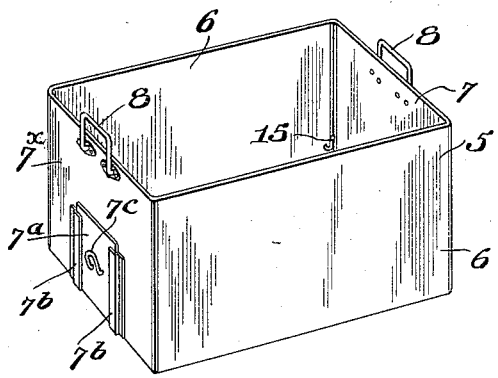
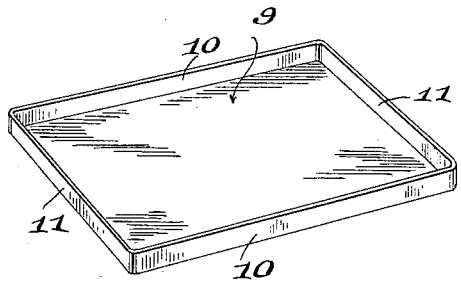
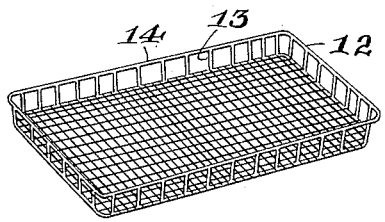
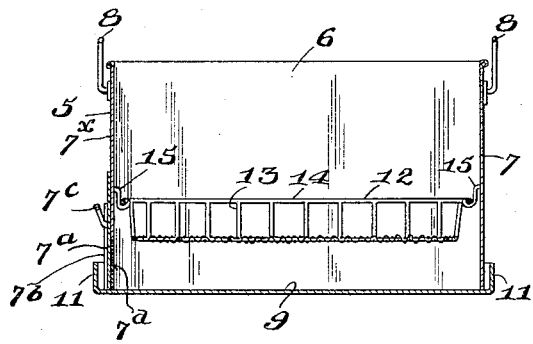
Inventor
Lillie Hazy
By Seymour & Bright
Attorneys Patented May 5, 1931

1,804,099

UNITED STATES PATENT OFFICE

LILLIE HAZY, OF NEW YORK, N. Y.

KITCHEN UTENSIL

Application filed March 1, 1929. Serial No. 343,729.

This invention relates to improvements in kitchen utensils, and more particularly to a novel device for use in cleaning or washing spinach or other vegetables or fruits which have to be immersed in water to eliminate sand, dirt, etc.

The primary object of the invention is to provide a vegetable or fruit washer of simple, inexpensive and durable construction.

Another object is to furnish a washer or cleaner having perforations or wire screen in one of its side walls designed to catch and retain, sand, dirt, skins, refuse, or the like, which is washed from the vegetables or fruits, to prevent such foreign substances from passing down the drain pipe of a sink, or the like, and stopping or forming an obstruction in such pipe.

Another object is to provide a cleaner or washer which may be set in a sink for instance, under the water spigot, so that the vegetables or fruit may be automatically washed when the water is turned on to the same, and this without discharging the dirt, sand, skins, or the like into the sink. The vegetables or fruits can be dried after rinsing in the same container, thereby eliminating the necessity of removing the same to some other receptacle.

With the foregoing objects outlined and with other objects in view which will appear as the description proceeds, my invention consists in the novel features hereinafter described in detail, illustrated in the accompanying drawing, and more particularly pointed out in the appended claims.

Referring to the drawings,—

Figure 1 is a perspective view of the tubular part or main portion of the device.

Figure 2 is a similar view of a removable tray which forms the bottom of the tubular part or main container.

Figure 3 is a perspective view of the wire tray which holds the vegetables or fruits, and is adapted to be suspended within the main container.

Figure 4 is a longitudinal vertical sectional view of the parts in assembled relation.

In the drawings, 5 designates a tubular, bottomless container which consists of an endless wall that may be made up of imperforate sides 6, imperforate end 7 and an apertured end 7x connected at the corners by watertight joints. Suitable handles 8 may be provided at the upper ends of the end walls. For the purpose of releasing water from the container before lifting the latter, I prefer to provide the lower portion of the end 7x with a perforated or wire-screen covered opening 7d that is normally closed by a sliding gate 7a, which moves in guides 7b and is provided with a handle 7c.

When the container 5 is in use, its lower end may be closed by a bottom member 9 which has upstanding relatively short side walls 10, and end walls 11; the walls being connected at their ends by water-tight joints, and the lower edges of the walls being connected to the bottom sheet also by water-tight joints. From Fig. 4 it will be understood that the inside dimensions of the endless wall formed by the parts 10 and 11, is slightly greater than the outside dimensions of the endless wall formed by the parts 6, 7 and 7x, so that a space is provided between the walls of the parts 5 and 9 to permit water deposited in the container to overflow over the walls 10 and 11, and to allow the part 5 to readily detach itself from the bottom 9 when the part 5 is lifted.

The device is completed by a third reticulated or perforated element of any suitable construction, such as a wire tray 12 which has an upstanding open-work wall 13 that terminates at its upper edge in an endless strip 14, which forms a handle means for the tray, and also allows the tray to be suspended in the main container by hooks 15, which are fixed to the corners of the part 5.

If the device is to be used for a spinach washer, I prefer to make the element 5 about seven inches in height, ten inches in width, and fourteen inches in length. The bottom 9 will be of such size that a small space will be provided between the walls of the parts 5 and 9 when these parts are assembled, and the walls 10 and 11 will be about one inch in height. The tray 12 will be about one inch deep, and one-half inch smaller all around than the inside dimensions of the container 5, and the hooks 15 will be about two inches from the lower end of the part 5. Of course, these dimensions are given by way of example, and the dimensions may be varied as desired.

It is also preferred that the parts be made of suitable metal, but it is manifest that other materials may also be used.

In operation, the bottom 9 is placed in the sink, and the container 5 is placed upright within the same, and then the open-work tray 12 is placed on the hooks 15. Then spinach or other vegetables or fruit is laid on the tray, and the container 5 is filled almost to the top with water. After the vegetables or fruit are moved to and fro a few times, with the hands, the gate 7c is raised to release the water and then the container 5 is lifted by use of the handles 8, and water, sand and skins are drained off the bottom 9, and of course, the sand or the like will deposit itself on said bottom, from which it may be discharged without passing into the sink. The container 5 is then replaced on the bottom 9 for repetition of this method of rinsing, until the vegetables or fruit are sand-free.

From the foregoing it is believed that the construction, operation and advantages of the invention may readily be understood, and I am aware that changes may be made in the details disclosed, without departing from the spirit of the invention, as expressed in the claims.

What I claim and desire to secure by Letters-Patent, is:

1. A vegetable or fruit washer, including a bottom having an upstanding endless wall, a tubular container having its lower edge resting on the bottom and its wall arranged within and spaced from the upstanding wall, to permit the tubular container to readily detach itself from the bottom when the container is lifted, an open-work tray arranged in the tubular container, and means for supporting the tray above the lower end of the container.

2. A vegetable or fruit washer, including an imperforate bottom having upstanding relatively short side walls, an open-ended container resting on said bottom and having its side walls slightly spaced from said upstanding side walls to permit detachment of the container from the bottom, when the container is lifted, the side walls of the container being of greater height than the side walls of the bottom, an open-work tray arranged in the container, and means for supporting said tray in spaced relation to the bottom.

3. A vegetable or fruit washer, comprising an imperforate bottom having a short upstanding endless wall, a tubular container resting on the bottom and having its wall arranged within the upstanding wall, and spaced from the latter, supports secured within the container, and an open-work tray detachably mounted on said supports and suspended within the container in spaced relation to the bottom.

4. A vegetable or fruit washer, including a bottom having an upstanding endless wall, a tubular container having its lower edge resting on the bottom and its wall arranged within and spaced from the upstanding wall, to permit the tubular container to readily detach itself from the bottom when the container is lifted, an open-work tray arranged in the tubular container, means for supporting the tray above the lower end of the container; the lower end of a wall of the container being cut away to provide an opening, and a movable gate normally closing said opening.

In testimony whereof, I have signed this specification.

LILLIE HAZY.